Nov. 28, 1939.  B. H. MILLER  2,181,196
COMPOSITE FLANGE STRUCTURE
Filed July 8, 1936   3 Sheets-Sheet 1
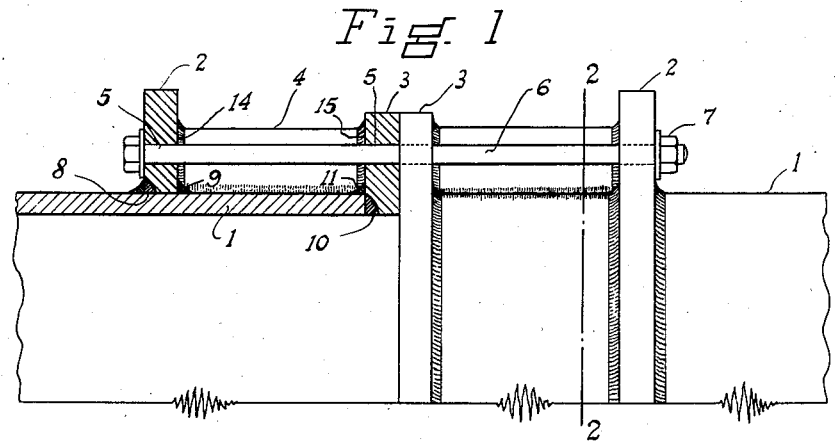
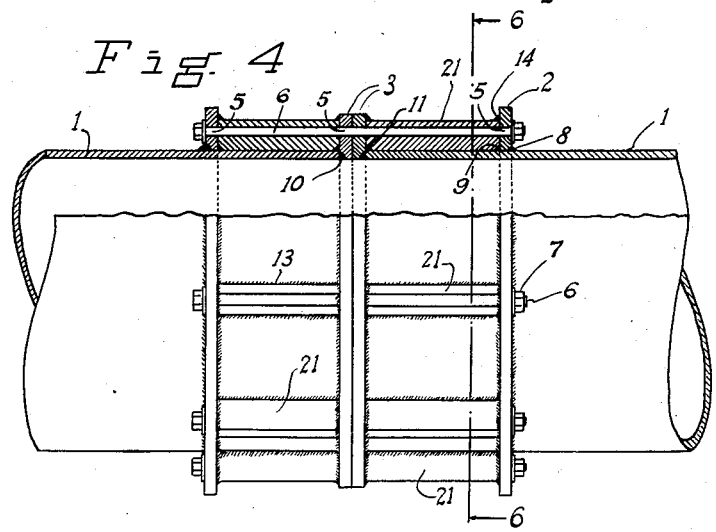
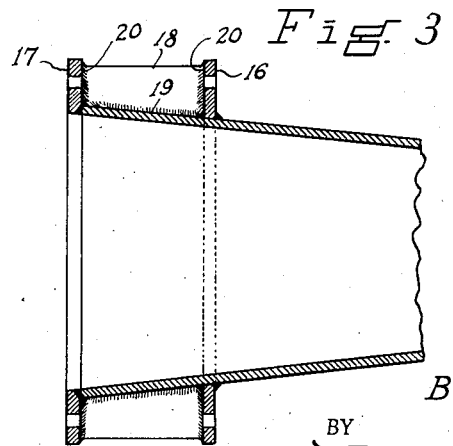
INVENTOR.
Benjamin H. Miller
BY
ATTORNEY.

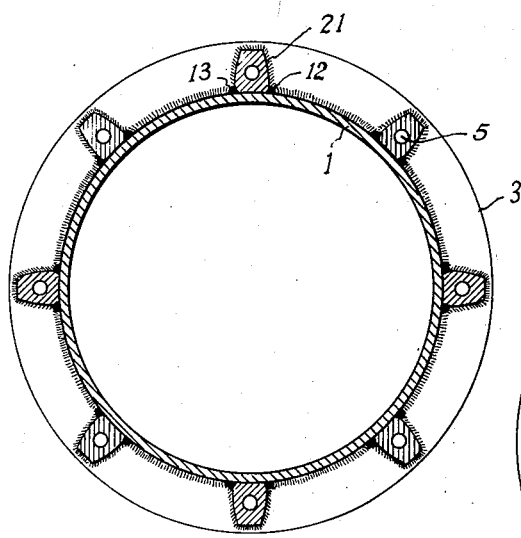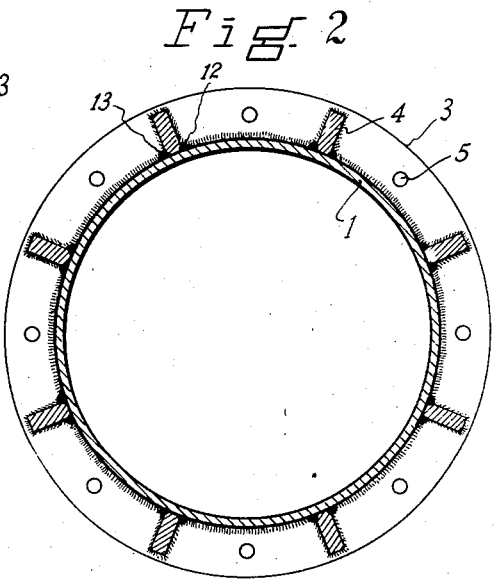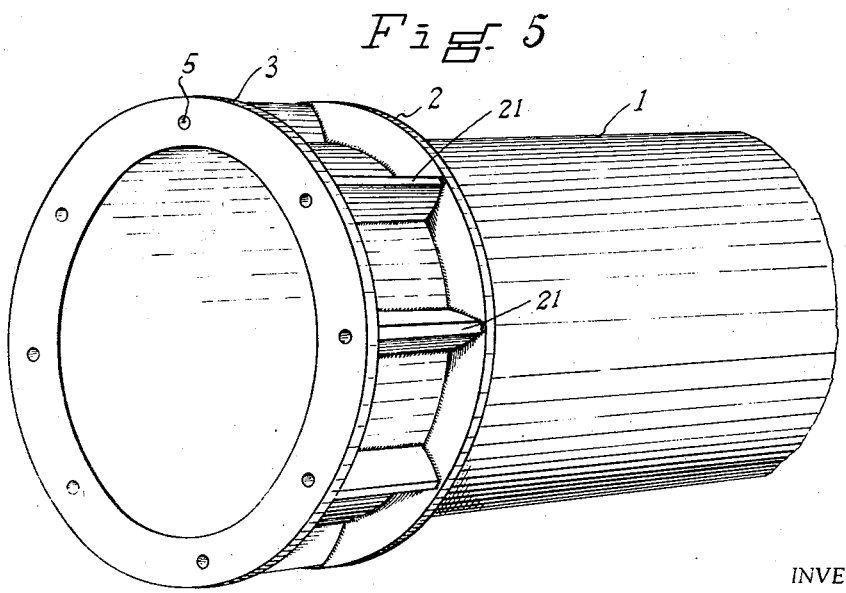

Nov. 28, 1939.   B. H. MILLER   2,181,196
COMPOSITE FLANGE STRUCTURE
Filed July 8, 1936   3 Sheets-Sheet 3

INVENTOR.
Benjamin H. Miller
BY
ATTORNEY.

Patented Nov. 28, 1939

2,181,196

UNITED STATES PATENT OFFICE 2,181,196

COMPOSITE FLANGE STRUCTURE

Benjamin H. Miller, Wadsworth, Ohio, assignor to The Babcock & Wilcox Company, Newark, N. J., a corporation of New Jersey Application July 8, 1936, Serial No. 89,532

12 Claims. (Cl. 285—137)

The invention disclosed herein is related to the construction and use of tubular bodies for the conduction of fluids under pressure, and particularly conduits of large diameter and relatively small wall thicknesses in which adjacent sections are secured together by bolted flanges.

Conduits of this description, whose walls are thin in proportion to their diameters, are in themselves quite flexible and readily subject to deformation. When it is desired to join one such section to an adjacent section by means of a bolted connection, for example, it becomes necessary to provide a stiff ring or flange at the end of each section, which will serve to reinforce the ends of the sections and provide the necessary stiffness for a satisfactory fluid-tight connection. In the usual fabrication of flanged conduits, it is customary to provide stiffness at the end of a section by means of a thick heavy ring secured to the conduit circumferentially, and the result is a localization of stresses over a relatively narrow band, unless the size of the ring is materially increased and the weight of the structure increased proportionately.

As an improvement over the constructions heretofore used it is my object to avoid the use of heavy solid body flanges and to prevent undue concentration of stress in the parts, by providing a connecting flange structure compositely formed of initially separate pieces.

A further object is to provide a composite form of flange which is adaptable to fabrication by welding and which may be assembled as a unit on the conduit or which may be formed by welding the component members to the conduit individually or in groups as may be desired.

Other objects of my invention are to provide for welding between parts in which the metal mass of the parts being joined is more nearly comparable than is the case where an extra heavy single piece flange member is used,—to secure the flanged structure to the conduit body in such a manner as to provide suitable anchorage and a wide distribution of stress in the conduit metal, and to produce a flanged structure of minimum weight for the duty to be imposed upon the same, thereby adding only slightly to the static load as compared with a solid flange for the equivalent duty.

In its more specific features, the invention also has reference to a method and means of flanging hollow bodies for connection to companion flanges by locating on such hollow bodies a plurality of spaced members, each of lesser thickness than mathematical computation indicates for the load to be carried if a single flange replaced the plurality, and so coordinated as to impart the required characteristics to safely do the same job as would be done by a flange of heavier construction, thus providing a flanged structure that can be readily built up from rolled plate stock as well as one particularly suited for fabrication by welding.

The several features of my invention are more fully disclosed in the accompanying specification and drawings, both as to the method involved and the means whereby it may be practiced.

The drawings are as follows:

Fig. 1 is a view partly in section showing two flanged conduit sections bolted together;

Fig. 2 is a transverse section along the line 2—2 of Fig. 1, and shows the form and location of the spacer bars or struts;

Fig. 3 is a longitudinal section showing a modification in which the composite flange structure is applied to a conduit of conical form at its end;

Fig. 4 is an assembly view, partly in section and similar to Fig. 1, but showing a further modification;

Fig. 5 is an isometric view of the flanged end of one of the conduit sections of Fig. 4;

Fig. 6 is a transverse section similar to Fig. 2 but taken along the line 6—6 of Fig. 4; and Figs. 7 and 8 are fragmentary views in section, illustrating additional modifications of my invention.

As an embodiment of the invention, Fig. 1 shows two conduit sections 1 bolted together to form a fluid-tight joint therebetween. At the end of each section and secured thereto, is a composite flange structure which serves to stiffen the end of the conduit and provides the necessary bolting flange whereby one section may be connected to the adjacent section. The composite flange consists of spaced annular flange plates 2 and 3 with spacer bars or struts 4 located therebetween and welded at their ends to each of the ring members.

If desired, the rings and struts may be integrally united as described and the entire assembly mounted as a whole on the conduit body 1, the rings and struts being welded to the conduit as described in detail hereinafter. An alternate method of fabrication is to build up the flange by successively welding individual members or groups of members in place on the conduit, and then completing the assembly by welding contiguous parts to one another as required. In the finished structure, the flange plates 2 and 3 are indicated as continuous circumscribing rings, but may be so formed by welding together separate arcuate plate sections.

Holes 5 are provided in the flanges, the holes in both flanges being identically arranged with respect to the central axis of the section and the flanges so assembled on the section as to place the holes in flange 2 in alignment with corresponding holes in flange 3. The arrangement of bolt holes in the complementary flanged body or section duplicates that on the first named section so that corresponding holes in both sections will register throughout. Bolts 6 are passed through the sets of registering holes, and nuts 7 drawn up to hold the two sections together.

The inner flange plate 2 has an internal diameter slightly greater than the outside diameter of the conduit section and is secured to the section at a suitable distance from the end by a circumferential line of welding, preferably on both sides, as at 8 and 9.

The outer flange plate 3 has an internal diameter substantially equal to the inside diameter of the conduit, and is welded to the end of the section by circumferential welds as at 10 and 11. The inner and outer flanges are preferably chamfered at their inner circumferences 8 and 10 respectively, to receive the deposits of welding metal.

The spacer bars, in the specific example, extend longitudinally between flanges 2 and 3, and are arranged circumferentially about the conduit section at positions intermediate the registering bolt-holes. The spacer bars which are shown as radially disposed ribs, rectangular in cross section, are rigidly secured to the shell and ring members, preferably by welding, the bars being welded to the shell along their edges as at 12 and 13, and to the rings at their ends as at 14 and 15.

The entire flange assembly, consisting of the annular flange plates and spacer members, is of less weight than the mathematical computation would indicate for a single solid flange to sustain the equivalent load. Furthermore the composite type of flange lends itself to fabrication by welding, in that the bodies being united are more nearly equal in mass, which is an important factor in securing satisfactory welds and in minimizing strains in the welded joint. The use of a plurality of flange plates, each of smaller proportions than a single solid flange, together with the plurality of associated spacer bars, permits the attachment of the several elements at a greater number of locations longitudinally of the conduit than is possible in the case of a solid flange and results in a better distribution of stresses in the associated pipe section.

The modification in Fig. 3 shows the application of my invention to a conduit section which is conical in form at its end. The flange rings 16 and 17 are preferably tapered at their inner diameters to correspond to the taper of the conduit. The inner ring 16 may be assembled on the conduit section from the smaller end and by suitable selection of its inner diameter may be fitted snugly against the outer wall of the conduit before being welded in position, thus acting to more directly resist the hoop stress in the conduit. The spacer bars 18 are so formed that their inner edges 19 are inclined to their parallel ends 20, thus permitting a close fit with the tapered exterior of the conduit.

The modification illustrated in Figs. 4, 5 and 6 provides for a location of spacer members 21 in alignment with the registering holes in flanges 2 and 3. In order to accommodate the holding bolts 6, holes are drilled or otherwise provided in the members 21 and are made to register with the holes in both flange plates. The form of the members 21 has been indicated only diagrammatically and may be of any desired form suitable for the accommodation of the holding bolts and for the load imposed, but at the same time utilizing readily formed shapes and maintaining the weight at a minimum.

In Fig. 7, conduit 1 terminates in a thickened end portion which is provided by a conical extension 22 welded to the main body of the conduit at 23 and forms an outwardly expanding continuation of the conduit bore. The outer wall of the extension is tapered at 24 to provide a thickness of metal substantially equal to the wall thickness of the conduit at the welded connection. A flange 25 is mounted on the thickened extension at a suitable distance from its outer end and secured to the extension by an annular weld 26. Struts 27, arranged at intervals circumferentially of the conduit, as in the other forms, are welded to the flange 25 at 28 and to the conduit wall at 29. Holes 30 are provided in the flange to receive studs 31 which are screwed into threaded holes 32 in flange 33 of the companionate body 34, nuts 35 being provided on the studs to hold the end of the thickened extension in fluid-tight engagement with flange 33 of the companionate body. A packing insert 36 within groove 37 in the face of one of the contacting flanges 33 further insures the maintenance of a fluid-tight connection. The combination of the heavy-walled extension 22, the flange 25 and the struts 27, forms a composite flange structure integral with the conduit and is not only adaptable but also preferable for the same service as a single heavy ring of substantially equal overall dimensions. When subjected to internal pressure, the hoop stress developed in the conically formed extension tends to counteract any tendency of the flange 25 to dish inwardly, thus preserving the tightness of the joint between the conduit and the companionate body which would otherwise be impaired.

The modification shown in Fig. 8 also includes a conical extension 22 welded to the conduit at 23 and tapered at 24 similar to the form in Fig. 7. A flange or stiffener ring 38 circumscribes the thickened extension and is secured thereto by an annular weld 39 at its inner circumference. A bolting flange 40 is secured to the end of the extension by welding at 41, and is provided with holes 42 for the accommodation of studs 43 which are screwed into threaded holes 44 in flange 45 of the companionate body. In this form, it will be noted that the composite structure includes a plurality of flange members, but that the tension members 43 extend through only one of the members and are directed at an angle to the conduit axis which is opposite to the inclination of the flared end of the conduit. The ring 38 increases the hoop strength of the thickened extension and thereby provides additional resistance to any tendency of the flange 40 to tilt after the bolted connection is made between the conduit and the companionate body.

Other variations are permissible under my invention so that in the definition of the invention by the following claims, I include such departures from the specific embodiments herein disclosed.

I claim:

1. A flanged structure comprising adjoining bodies, at least one of which is tubular and has an end flange secured thereto and companionate to another body, an additional circumscribing flange spaced along the tubular body, both flanges having registering openings, spacer members between the flanges, and tension members extending through the openings of both flanges and into the companionate body to connect the bodies in assembled relation.

2. A flanged structure comprising adjoining bodies, at least one of which is tubular and has an end flange secured thereto and companionate to another body, an additional circumscribing flange spaced along the tubular body, both flanges having registering openings, spacer members between the flanges and welded thereto at radii exceeding the flange openings, and tension members extending through the drillings of both flanges and into the companionate body to connect the bodies in assembled relation.

3. A flanged structure comprising adjoining bodies, at least one of which is tubular and has an end flange secured thereto and companionate to another body, an additional circumscribing flange spaced along the tubular body and welded thereto, both flanges having registering openings, struts between the flanges, and tension members extending through the openings of both flanges and into the companionate body to connect the bodies in assembled relation.

4. A flanged structure comprising adjoining bodies, at least one of which is tubular and has an end flange secured thereto and companionate to another body, an additional circumscribing flange welded to and spaced along the tubular body, both flanges having registering openings, a strut-forming means between the flanges and connected to each by welding on a circumference encompassing the flange openings, and tension members extending through the openings of both flanges and into the companionate body to connect the bodies in assembled relation.

5. A flanged structure comprising adjoining bodies, at least one of which is tubular and has an end flange secured thereto and companionate to another body, an additional circumscribing flange spaced along the tubular body, both flanges having registering openings, spacer members engaging both flanges and welded to the tubular body, and tension members extending through the openings of both flanges and into the companionate body to connect the bodies in assembled relation.

6. A flanged structure comprising adjoining bodies, at least one of which is tubular and has an end flange secured thereto and companionate to another body, an additional circumscribing flange spaced along the tubular body, both flanges having registering openings, circumferentially spaced elements engaging each of the flanges and welded to the tubular body and one of said flanges, and tension members extending through the openings of both flanges and into the companionate body to connect the bodies in assembled relation.

7. A flanged structure comprising adjoining bodies, at least one of which is tubular and has an end flange secured thereto and companionate to another body, an additional circumscribing flange spaced along the tubular body and welded thereto, both flanges having registering openings, a plurality of struts between the flanges and welded to each flange and to the tubular body, and tension members extending through the openings of both flanges and into the companionate body to connect the bodies in assembled relation.

8. A flanged structure comprising adjoining bodies, at least one of which is tubular and has an end flange secured thereto and companionate to another body, an additional circumscribing flange spaced along the tubular body, both flanges having registering openings, spacer members between the flanges and having openings alined with the openings in the flanges, and tension members extending through the openings of both flanges and into the companionate body to connect the bodies in assembled relation.

9. A flanged structure comprising adjoining bodies, at least one of which is tubular and has an end flange secured thereto and companionate to another body, an additional circumscribing flange spaced along the tubular body, both flanges having registering openings, spacer members between the flanges and each welded to the flanges and to the body, and tension members extending through the openings of both flanges and into the companionate body to connect the bodies in assembled relation.

10. A flanged conduit of large diameter and relatively small wall thickness subject to internal fluid pressure and adapted for connection to a companionate body, said conduit terminating in an end portion composed of initially separate members welded together and to the conduit and comprising an end member of greater dimension radially than the wall thickness of the conduit body, a circumscribing flange welded to the conduit and spaced from its end, and tension members securing said conduit in fluid-tight contact with said companionate body.

11. A conduit fitting adapted for connection to a companionate body comprising conical sections connected in end to end relation so as to provide a fitting of increasing internal diameter toward one end, said sections being of substantially registering thicknesses and diameters at their juncture and the section of larger diameter having a wall thickness greater than the section of smaller diameter each throughout the major portion of its length, said thickened end section having an annular flange secured thereto at a location intermediate its ends, and said section being formed to receive tension members for connecting said fitting to said companionate body.

12. A flanged conduit fitting of conical interior formation adapted for connection to a companionate body, said fitting having an end flange secured thereto and an additional circumscribing flange longitudinally spaced therefrom, spacer members between the flanges, and both flanges having registering openings adapted to receive tension members for connecting said fitting and body in assembled relation.

BENJAMIN H. MILLER.

CERTIFICATE OF CORRECTION.

Patent No. 2,181,196.  November 28, 1939.

BENJAMIN H. MILLER.

It is hereby certified that error appears in the printed specification of the above numbered patent requiring correction as follows: Page 3, first column, line 18, claim 2, for the word "drillings" read openings; line 37, claim 4, strike out "a" before "strut-forming"; and that the said Letters Patent should be read with this correction therein that the same may conform to the record of the case in the Patent Office.

Signed and sealed this 12th day of March, A. D. 1940.

(Seal)
Henry Van Arsdale,
Acting Commissioner of Patents.